D. M. GARRETT.
Horse Hay Fork.
No. 49,621.
Patented Aug. 29, 1865.
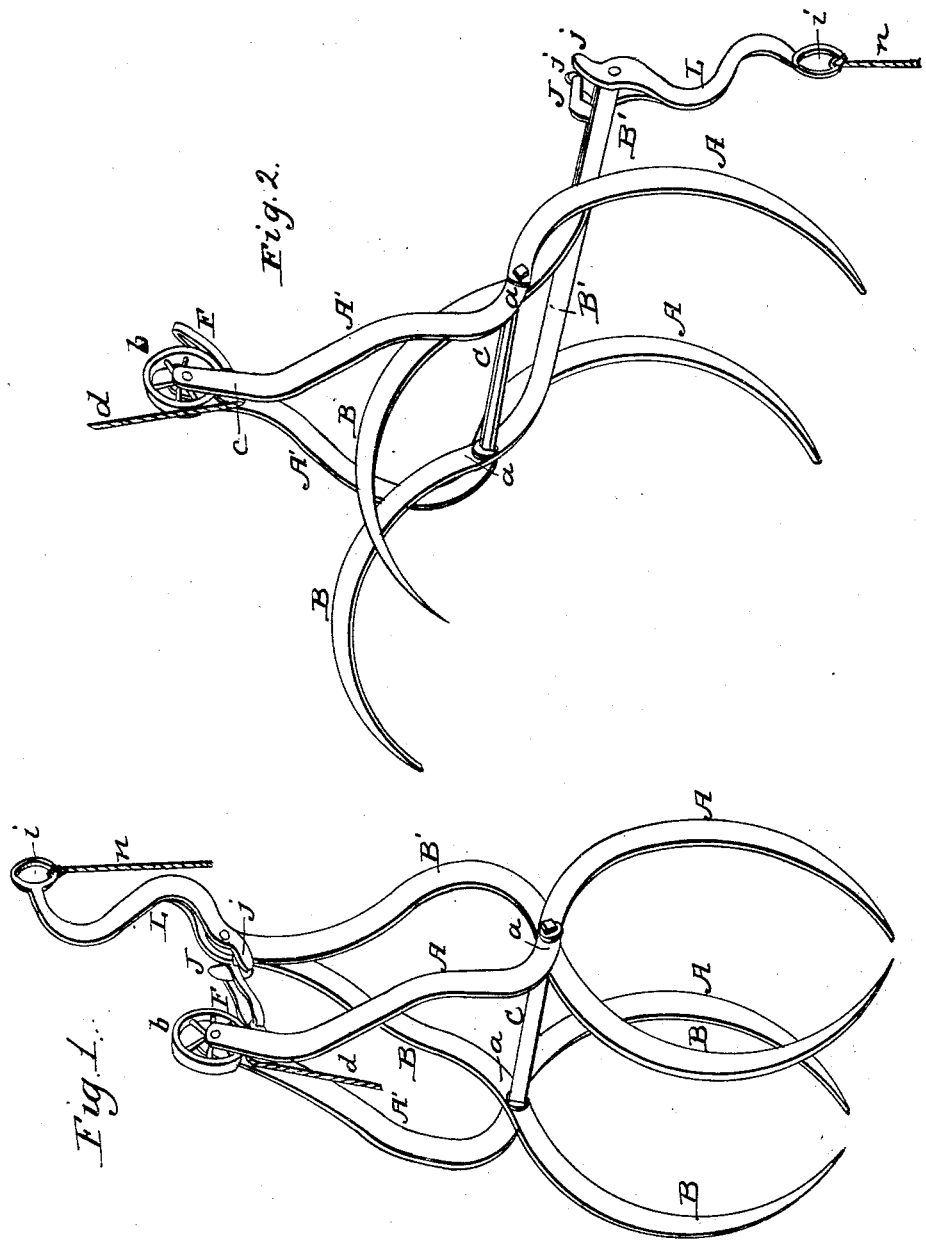

UNITED STATES PATENT OFFICE.

D. M. GARRETT, OF SHELBY, OHIO.

IMPROVEMENT IN HORSE HAY-FORKS.

Specification forming part of Letters Patent No. 49,621, dated August 29, 1865.

*To all whom it may concern:*

Be it known that I, D. M. GARRETT, of Shelby, in the county of Richland and State of Ohio, have invented certain new and useful Improvements in Hay-Forks; and I hereby declare that the following is a full and complete description of the construction and operation of the same, reference being had to the accompanying drawings, making a part of this specification, in which—

Figures 1 and 2 are perspective views of the fork in different positions.

Like letters of reference denote like parts in the two views.

My improvement relates to a fork for loading and unloading hay, as hereinafter described.

The fork consists of metallic prongs or teeth A and B, curved round and pointed at the ends, as represented, formed in one piece with the part A' B', making arms or handles, each prong and arm being in one entire piece. The arms are curved and inclined, so as to come together in a line midway between the prongs, as shown in the drawings. The arms, as they separate widening the space between them, are such a distance apart that the arms B' and prongs B will fit closely inside of the arms A' and prongs A about the middle, where they are connected together by a cross-bar, C, which extends through them, with a washer, a, on the inside and outside, secured in place by a screw-nut on each end of the bar, so that there is no lateral movement of the prongs, and they are allowed to turn freely on or with the bar.

In the upper part of the arms A', between them, is a pulley, b, running on a pin secured in the arms, and just below the pulley is a roller, c, over which the rope d passes, and runs in a groove in the rim of the pulley b, that the rope fits into as it comes on either side of it. To one end of this rope is attached a link, F.

In the upper end of the arms B' is secured a hook, J, and on the outside is pivoted a lever, L, which is forked where it is connected to the end of the arms, as represented. The outer end of the lever is formed into a ring, i, to which is fastened a rope, n.

The manner in which this fork operates in loading and unloading hay is as follows: The fork is suspended over the hay by the rope d passing over a pulley. When the link F is removed from the hook J the prongs separate, as in Fig. 2, and in that position the fork can be let down onto the hay to receive its load by the rope d, when the prongs are put into the hay, and the link F is placed on the hook J, with the ends j of the lever underneath. Then by pulling the rope d the prongs are brought together, as in Fig. 1, taking up a large amount of hay between them, which is swung over into the bay by the rope d, and when in the desired position to discharge the load, by pulling the rope n, connected with the lever L, the link is tripped from the hook, the ends of the lever being under the link, as in Fig. 1, when the prongs immediately separate, discharging the hay from the fork into the bay. The fork can then be let down for another load, as before.

The forked ends j of the lever for tripping the link are on each side of the hook J, which raises the link with much more ease and facility than a single fork or end would do under the link.

Each of the prongs A B and the corresponding arms being in one entire piece, as before stated, and so formed and connected together as to support the pulley b and lever L, as described, has many advantages, dispensing with all wooden beams, rendering the fork very neat in construction, effectual in operation, and very strong and durable, being entirely metal.

What I claim as my improvement, and desire to secure by Letters Patent, is—

The arms A' and B', curved laterally, as shown and described, for the purpose of dispensing with the wooden heads, in combination with wheel b, hook J, link F, and lever L, when said parts are constructed and arranged as herein shown and described.

D. M. GARRETT.

Witnesses:
SAMUEL WHITNEY,
WILLIAM BRECKBILL.